United States Patent Office 2,954,394
Patented Sept. 27, 1960

2,954,394

O-ARYL O-ALKYL O-HYDROGEN PHOSPHORO-
THIOATES AND THEIR SALTS

Etcyl H. Blair and Edgar C. Britton, Midland, Mich., assignors to The Dow Chemical Company, Midland, Mich., a corporation of Delaware No Drawing. Filed June 10, 1957, Ser. No. 664,499

6 Claims. (Cl. 260—461)

This invention is concerned with the O-aryl O-alkyl O-hydrogen phosphorothioates having the formula

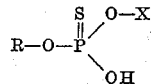

and their alkali metal, ammonium, hydrazine and amine salts. In this and succeeding formulas, R represents haloaryl and X represents a lower alkyl radical. The term "lower alkyl" refers to those radicals containing from 1 to 4 carbon atoms, inclusive. The new O-aryl O-alkyl O-hydrogen phosphorothioates are viscous liquids or crystalline solids while the ammonium and amine salts of these phosphorothioates are crystalline solids. The phosphorothioates and their salts are somewhat soluble in most organic solvents. The ammonium and methylamine salts of the new phosphorothioates are soluble in water whereas the O-aryl O-alkyl O-hydrogen phosphorothioates are of low solubility is nwater. The phosphorothioates and their ammonium, hydrazine and amine salts are active as parasiticides and are adapted to be employed as active toxic constituents of compositions for the control of bacteria, fungi, mites and insect organisms such as Southern army worms and flies. The compounds are also useful as herbicides for the control of the growth of seeds and seedlings.

The new O-aryl O-alkyl O-hydrogen phosphorothioates may be prepared by reacting together water, a lower alkanol, and a phosphorodichloridothioate of the formula

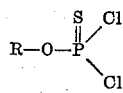

The reaction may be carried out in the presence of an inert solvent such as ethylene dichloride, benzene, toluene, chloroform or chlorobenzene. Good results are obtained when employing one molecular proportion of phosphorodichloridothioate with from 1 to 5 molecular proportions of water and from 1 to 12 molecular proportions of a lower alkanol. The reaction is somewhat exothermic and takes place smoothly at temperatures greater than 14 centigrade degrees below the boiling point of the employed alkanol with the formation of the desired product and hydrogen chloride of reaction. When employing an excess of lower alkanol, some of the lower alkanol reacts with the hydrogen chloride to form alkyl chloride and water. Thus, the reaction may be carried out under conditions such that water appears to be formed in situ in the reaction zone. In such operations, good results are obtained when employing one molecular proportion of phosphorodichloridothioate with from 2 to 6 molecular proportions of lower alkanol. A significantly larger proportion of the lower alkanol materially reduces the yield of the desired product and results in the formation of undesirable materials. It is essential when operating under conditions such that the aqueous reactant is formed in situ from the reaction of by-product hydrogen chloride and lower alkanol, that one molecular proportion of phosphorodichloridothioate be employed with not to exceed 6 molecular proportions of lower alkanol.

The new alkali metal, ammonium, hydrazine and amine salts of the O-aryl O-alkyl O-hydrogen phosphorothioates may be prepared by reacting an O-aryl O-alkyl O-hydrogen phosphorothioate with a stoichiometric amount of an alkali metal hydroxide, ammonia, hydrazine or an amine such as methylamine, butylamine, triethylamine, dodecylamine, ethanolamine, triethanolamine, butanolamine, diethanol-monoisopropanolamine, ethylene diamine, cyclohexylamine, aniline or benzylamine. The preparation of the alkali metal salts is carried out in water while the preparation of the other salts conveniently may be carried out in an inert organic solvent. The reaction takes place smoothly in the temperature range of from $-10°$ to $40°$ C. with the formation of the desired salt product. During the reaction, the salt oftentimes precipitates in the reaction mixture as a crystalline solid. Upon completion of the reaction, a greater portion of the reaction solvent may be removed by evaporation and the resulting mixture cooled to precipitate the salt product or to precipitate further product. The product is separated by filtration or decantation. If desired, the product may be purified by recrystallization from an organic solvent.

In the preparation of the O-aryl O-alkyl O-hydrogen phosphorothioates of the present invention, the phosphorodichloridothioate, alkanol, water and solvent, if employed, are mixed together and the resulting mixture heated in the temperature range of from 14 centigrade degrees below the boiling point of the employed alkanol to the boiling temperature of the reaction mixture. In an alternative method wherein the aqueous reactant is formed in situ in the reaction mixture from the reaction of by-product hydrogen chloride and alkanol, one molecular proportion of the phosphorodichloridothioate is mixed with from two to six molecular proportions of the lower alkanol and the resulting mixture maintained for a period of time in the reaction temperature range.

Upon completion of the reaction, the reaction mixture may be washed with water and thereafter diluted with a water-immiscible solvent. The solvent mixture conveniently is thereafter treated with an equivalent amount of an aqueous solution of ammonium hydroxide, methylamine or alkali metal hydroxide such as sodium hydroxide or potassium hydroxide to produce the corresponding ammonium, methylamine or alkali metal salt of the O-aryl O-alkyl O-hydrogen phosphorothioate. These salt products are soluble in water and may be separated in the aqueous phase by decantation. The aqueous solution of the salt is then treated with an equivalent proportion of hydrochloric acid to convert the salt to the desired O-aryl O-alkyl O-hydrogen phosphorothioate product. During the acidification of the aqueous solution of the salt, the desired O-aryl O-alkyl O-hydrogen phosphorothioate product separates in the reaction mixture as a liquid material or crystalline solid. This product may be separated by decantation or filtration and purified by conventional methods.

The following examples illustrate the invention but are not to be construed as limiting.

*Example 1.—O-(2,4,5-trichlorophenyl) O-methyl O-hydrogen phosphorothioate and its ethylamine salt*

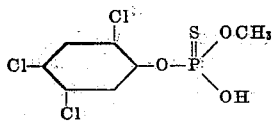

A solution of two moles (661.6 grams) of O-(2,4,5-trichlorophenyl) phosphorodichloridothioate in 500 milliliters of ethylidene dichloride was mixed with four moles (128 grams) of methanol and the resulting mixture heated at the boiling temperature (51°–56° C.) and under reflux for 6 hours to produce an O-(2,4,5-trichlorophenyl) O-methyl O-hydrogen phosphorothioate product. During the heating period, methyl chloride of reaction was evolved. Aqueous ethylamine was then added at room temperature to the reaction mixture in the amount of about 2 moles and until the mixture was slightly basic. The reaction mixture was thereafter washed with water and set aside at room temperature for about 3 hours. During this period, an O-(2,4,5-trichlorophenyl) O-methyl O-hydrogen phosphorothioate ethylamine product precipitated as a monohydrate in the reaction mixture in the form of a white crystalline solid and was separated by filtration. This product was recrystallized from ethylene dichloride and found to melt at 128°–132° C. The product had a phosphorus content of 9.90 percent and a sulfur content of 9.89 percent as compared to the calculated values of 9.54 percent and 9.87 percent, respectively, for the acid amine salt monohydrate.

*Example 2.—O-(2,4,5-Trichlorophenyl) O-methyl O-hydrogen phosphorothioate and its dicyclohexylamine salt*

162.5 grams (0.5 mole) of O-(2,4,5-trichlorophenyl) phosphorodichloridothioate, 165 grams (5.15 moles) of methanol and 18 grams (1.0 mole) of water were mixed together and the resulting mixture heated at a temperature of 55°–63° C. for 3 hours. Upon completion of the reaction, the reaction mixture was diluted with 250 milliliters of methylene chloride and 500 milliliters of water. The organic layer was then separated by decantation and washed with water to obtain a methylene chloride solution of O-(2,4,5-trichlorophenyl) O-methyl O-hydrogen phosphorothioate. Fifty grams of dicyclohexylamine was added with stirring to the organic solvent solution of the phosphorothioate at room temperature and stirring thereafter continued for 30 minutes. During the stirring, an O-(2,4,5-trichlorophenyl) O-methyl O-hydrogen phosphorothioate dicyclohexylamine salt product precipitated in the reaction mixture as a crystalline solid and was separated by filtration and washed with water. O-(2,4,5-trichlorophenyl) O-methyl O-hydrogen phosphorothioate dicyclohexylamine salt has a molecular weight of 490.

*Example 3.—O-(2-chlorophenyl) O-ethyl O-hydrogen phosphorothioate*

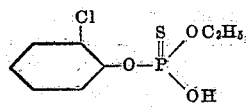

A mixture of 65 grams (0.25 mole) of O-(2-chlorophenyl) phosphorodichloridothioate, 46 grams (1 mole) of ethanol and 18 grams (1.0 mole) of water is heated at the boiling temperature of the reaction mixture and under reflux for a period of 4 hours. Upon completion of the reaction the reaction mixture is diluted with 125 milliliters of methylene chloride and thereafter neutralized with dilute aqueous sodium hydroxide to produce an O-(2-chlorophenyl) O-ethyl O-hydrogen phosphorothioate sodium salt product which is separated in the aqueous phase by decantation. Treatment of the aqueous solution of the sodium salt with 0.2 mole of hydrochloric acid gives the corresponding O-(2-chlorophenyl) O-ethyl O-hydrogen phosphorothioate. O-(2-chlorophenyl) O-ethyl O-hydrogen phosphorothioate has a molecular weight of 252.

*Example 4.—O-(2,4,5-trichlorophenyl) O-methyl O-hydrogen phosphorothioate ammonium salt*

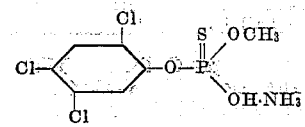

10 grams of O-(2,4,5-trichlorophenyl) O-methyl O-hydrogen phosphorothioate was dissolved in benzene and gaseous ammonia in excess of 0.03 mole was passed into the resulting solution. The addition was carried out with stirring and at room temperature. Following the addition, the benzene was removed by distillation under reduced pressure to obtain as a white solid residue an O-(2,4,5-trichlorophenyl) O-methyl O-hydrogen phosphorothioate ammonium salt product. This product was recrystallized from benzene and found to melt at 195° C. It contained 31.68 percent chlorine and 4.28 percent nitrogen compared to the theoretical values of 32.77 percent and 4.31 percent respectively.

*Example 5.—O-(2,4,5-trichlorophenyl) O-methyl O-hydrogen phosphorothioate and its methylamine salt*

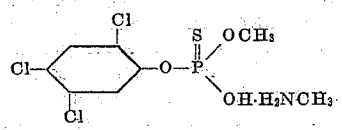

O-(2,4,5-trichlorophenyl) phosphorodichloridothioate (1 mole) was dissolved in 250 milliliters of ethylene dichloride and mixed with 6 moles of methanol. The resulting mixture was heated at a temperature of from 62°–66° C. for a period of 12 hours to produce an O-(2,4,5-trichlorophenyl) O-methyl O-hydrogen phosphorothioate product. During the heating period, methyl chloride of reaction was evolved. An amount of anhydrous gaseous methylamine in excess of 0.14 mole was then passed into a portion (101 grams) of the reaction mixture dissolved in 250 milliliters of ethylene dichloride. The addition was carried out with stirring and at a temperature of from 10° to 20° C. The solvent and excess amine were then removed by evaporation to obtain a solid residue which was twice washed with 200 milliliter portions of hot benzene. As a result of these operations, there was obtained an O-(2,4,5-trichlorophenyl) O-methyl O-hydrogen phosphorothioate methylamine salt product as a crystalline solid. This product after recrystallization from chlorobenzene was a white solid which melted at 154°–156° C. and contained 9.80 percent phosphorus and 30.72 percent chlorine compared to the theoretical values of 9.45 percent and 31.5 percent, respectively.

*Example 6.—O-(2,4,5-trichlorophenyl) O-methyl O-hydrogen phosphorothioate cyclohexylamine salt*

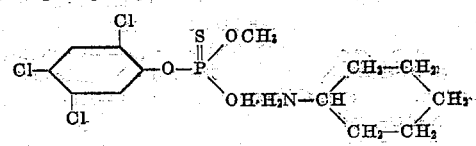

A 100 milliliter portion of the reaction mixture prepared in Example 5 containing O-(2,4,5-trichlorophenyl) O-methyl O-hydrogen phosphorothioate was dissolved in 50 milliliters of ethylidene dichloride and an amount of cyclohexylamine in excess of 0.1 mole added portionwise thereto with stirring. The addition was carried out in 30 minutes and at a temperature of 10° C. Following the addition, the reaction mixture was stirred at room temperature for one hour. During the reaction, a product separated in the reaction mixture as a crystalline solid. Upon completion of the reaction, the crystalline product was separated by filtration and washed with boiling benzene. As a result of these operations, there was obtained an O-(2,4,5-trichlorophenyl) O-methyl O-hydrogen phosphorothioate cyclohexylamine salt product as a crystalline residue which was found to melt at 199°–200° C. This product contained 38.57 percent carbon and 7.63 percent phosphorus compared to the theoretical values of 38.38 percent and 7.61 percent, respectively.

*Example 7.—O-(2,4,5-trichlorophenyl) O-methyl O-hydrogen phosphorothioate dicyclohexylamine salt*

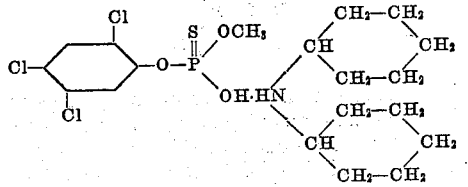

A two gram portion of the reaction mixture prepared in Example 5 containing O-(2,4,5-trichlorophenyl) O-methyl O-hydrogen phosphorothioate was dissolved in methylene chloride and about 2 grams of dicyclohexylamine was added thereto at room temperature. The reaction mixture was set aside overnight and thereafter filtered to obtain an O-(2,4,5-trichlorophenyl) O-methyl O-hydrogen phosphorothioate dicyclohexylamine salt product as a white crystalline solid. This product was washed with methylene chloride, and the washed product found to melt at 176°–179° C. and contain 21.78 percent chlorine compared to the theoretical chlorine content of 21.80 percent.

*Example 8.—O-(2,4,5-trichlorophenyl) O-methyl O-hydrogen phosphorothioate aniline salt*

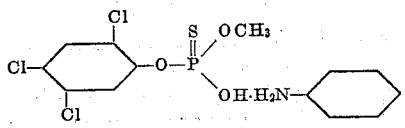

A 100 milliliter portion of the reaction mixture prepared in Example 5 containing O-(2,4,5-trichlorophenyl) O-methyl O-hydrogen phosphorothioate was dissolved in ethylidene dichloride and 24 grams of aniline added thereto with stirring. The addition was carried out at a temperature of 15° C. and over a period of 30 minutes. The white solid which formed during the reaction was separated by filtration and recrystallized from methylene chloride. As a result of these operations, there was obtained an O-(2,4,5-trichlorophenyl) O-methyl O-hydrogen phosphorothioate aniline salt product which melted at 175°–177° C. and contained 26.30 percent chlorine and 3.28 percent nitrogen compared to the theoretical values of 26.5 percent and 3.36 percent, respectively.

*Example 9.—O-(2,4,5-trichlorophenyl) O-methyl O-hydrogen phosphorothioate hydrazine salt*

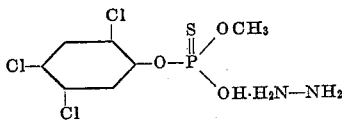

A 100 milliliter portion of the reaction mixture prepared in Example 5 containing O-(2,4,5-trichlorophenyl) O-methyl O-hydrogen phosphorothioate was dissolved in ethylidene dichloride. Hydrazine hydrate (17 grams) was added portionwise to the resulting solution. The addition was carried out with stirring and at a temperature of 15° C. Following the addition, stirring was continued for one hour at room temperature. The white crystalline solid which formed during the reaction was separated by filtration and recrystallized from methylene chloride. As a result of these operations, there was obtained an O-(2,4,5-trichlorophenyl) O-methyl O-hydrogen phosphorothioate hydrazine salt product which melted at 185°–186° C. and contained 8.99 percent phosphorus as compared to a theoretical value of 9.15 percent.

*Example 10.—O-(2,4,5-trichlorophenyl) O-methyl O-hydrogen phosphorothioate piperazine salt*

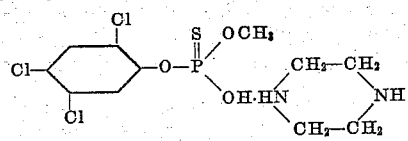

A 25 milliliter portion of the reaction mixture prepared in Example 5 containing O-(2,4,5-trichlorophenyl) O-methyl O-hydrogen phosphorothioate was dissolved in ethylidene dichloride and added portionwise with stirring to 10 grams of a 53.2 percent aqueous solution of piperazine hydrochloride. The addition was carried out in 2 minutes at room temperature. Following the addition, the reaction mixture was diluted with 100 milliliters of methylene dichloride to facilitate stirring. Stirring was then continued for an additional 5 minutes and the reaction mixture thereafter allowed to stand for 20 minutes. During this period, an O-(2,4,5-trichlorophenyl) O-methyl O-hydrogen phosphorothioate piperazine salt product solidified in the mixture in the form of the hydrochloride salt. The product was separated by filtration, washed with methylene chloride and air dried. O-(2,4,5-trichlorophenyl) O-methyl O-hydrogen phosphorothioate piperazine hydrochloride has a molecular weight of 430.1.

In a similar manner other O-aryl O-alkyl O-hydrogen phosphorothioates and alkali metal, ammonium, hydrazine and amine salts thereof may be prepared of which the following are representative:

O-(2-bromophenyl) O-isopropyl O-hydrogen phosphorothioate by reacting together water, isopropyl alcohol, and O-(2-bromophenyl) phosphorodichloridothioate. Reaction of this product with triethanolamine or butanolamine gives the corresponding alkanolamine salts.

O-(2,4-dichlorophenyl) O-ethyl O-hydrogen phosphorothioate by reacting together water, ethanol, and O-(2,4-dichlorophenyl) phosphorodichloridothioate. Reaction of this product with sodium or potassium hydroxide gives the sodium or potassium salts.

O-(2-chloro-4-methylphenyl) O-methyl O-hydrogen phosphorothioate by reacting together water, methanol, and O-(2-chloro-4-methylphenyl) phosphorodichloridothioate. Subsequent reaction of this product with hexylamine gives the hexylamine salt.

O-(3,4-dichlorophenyl) O-normalpropyl O-hydrogen phosphorothioate by reacting together water, normalpropyl alcohol, and O-(3,4-dichlorophenyl) phosphorodichloridothioate. Subsequent reaction of this product with dodecylamine gives the dodecylamine salt.

O-(4-tertiarybutyl-2-chlorophenyl) O-methyl O-hydrogen phosphorothioate by reacting together water, methanol, and O-(4-tertiarybutyl-2-chlorophenyl) phosphorodichloridothioate.

O-(2,3,4,5-tetrachlorophenyl) O-isobutyl O-hydrogen phosphorothioate by reacting together water, isobutyl alcohol, and O-(2,3,4,5-tetrachlorophenyl) phosphorodichloridothioate. Reaction of this product with ammonium hydroxide gives the ammonium salt.

O-(2,4,5-tribromophenyl) O-methyl O-hydrogen phosphorothioate by reacting together water, methanol, and O - (2,4,5-tribromophenyl) phosphorodichloridothioate. Reaction of this product with methylamine gives the methylamine salt.

O-(2,4,5-trichlorophenyl) O-ethyl O-hydrogen phosphorothioate by reacting together water, ethanol, and O - (2,4,5-trichlorophenyl) phosphorodichloridothioate. Reaction of this product with methylamine gives the methylamine salt melting at 125°–126° C.

O-(2-chloro-4-tertiaryamylphenyl) O-methyl O-hydrogen phosphorothioate ($n/D=1.541$ at 25° C.) by reacting together water, methanol, and O-(2-chloro-4-tertiaryamylphenyl) phosphorodichloridothioate. Reaction of this product with cyclohexylamine gives the cyclohexylamine salt melting at 97°–98° C.

O-(2,4,5-trichlorophenyl) O-methyl O-hydrogen phosphorothioate isopropylamine salt by the reaction of O-(2,4,5-trichlorophenyl) O-methyl O-hydrogen phosphorothioate and isopropylamine. This salt melts at 150°–151° C.

O-(2-bromo-4-tertiarybutylphenyl) O-methyl O-hydrogen phosphorothioate ($n/D=1.5475$ at 25° C.) by reacting together O-(2-bromo-4-tertiarybutylphenyl) phosphorodichloridothioate, methanol and water.

O-(2,4,5-trichlorophenyl) O-tertiarybutyl O-hydrogen phosphorothioate (melting point=115°–116° C.) by reacting together O-(2,4,5-trichlorophenyl) phosphorodichloridothioate, tertiarybutyl alcohol and water.

The new O-aryl O-alkyl O-hydrogen phosphorothioates and their alkali metal, ammonium, hydrazine and amine salts are effective as parasiticides and are adapted to be employed for the control of numerous household and agricultural pests. For such use, the products may be dispersed on an inert finely divided solid and employed as dusts. Such mixtures may also be dispersed in water and employed as sprays. The products may likewise be employed as constituents of oil-in-water emulsions with or without a wetting, dispersing or emulsifying agent. In representative operations, substantially 100 percent controls of American roaches, Mexican bean beetles and houseflies have been obtained with aqueous compositions containing 500 parts by weight of O-(2,4,5-trichlorophenyl) O-methyl O-hydrogen phosphorothioate cyclohexylamine salt per million parts by weight of ultimate mixture.

The O-aryl phosphorodichloridothioates employed as starting materials in the present invention may be prepared by reacting a molecular excess of phosphorus thiochloride (PSCl₃) with an alkali metal salt of a suitable phenol such as 2-chlorophenol, 4-bromophenol, 2,5 dichlorophenol, 2,4-dibromophenol, 2,4,6-trichlorophenol or a 2-halo-4-alkylphenol containing from 7 to 11 carbon atoms. Good results are obtained when employing from 2 to 4 moles of phosphorus thiochloride per mole of alkali metal salt. The alkali metal salt, preferably as the sodium salt, is added portionwise with stirring to the phosphorus thiochloride and the mixture subsequently warmed for a period of time to complete the reaction. The reaction mixture is then filtered and the filtrate fractionally distilled under reduced pressure to separate the desired product.

We claim:
1. A compound selected from the group consisting of (1) the O-aryl O-alkyl O-hydrogen phosphorothioates having the formula

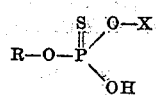

wherein R represents a member of the group consisting of halophenyl and haloalkylphenyl radicals containing from 7 to 11 carbon atoms, inclusive, and X represents a lower alkyl radical containing from 1 to 4 carbon atoms inclusive, and (2) the alkali metal, ammonium, alkylamine, alkanolamine, cycloalkylamine, aniline, piperizine and hydrazine salts of said O-aryl O-alkyl O-hydrogen phosphorothioates.

2. O - (2,4,5-trichlorophenyl) O-methyl O-hydrogen phosphorothioate.

3. O-(2,4,5-trichlorophenyl) O-tertiarybutyl O-hydrogen phosphorothioate.

4. O-(2-chloro-4-tertiarybutylphenyl) O-methyl O-hydrogen phosphorothioate.

5. Ethylamine salt of O-(2,4,5-trichlorophenyl) O-methyl O-hydrogen phosphorothioate.

6. Cyclohexylamine salt of O-(2,4,5-trichlorophenyl) O-methyl O-hydrogen phosphorothioate.

References Cited in the file of this patent
UNITED STATES PATENTS

| | | |
|---|---|---|
| 1,748,619 | Romieux et al. | Feb. 25, 1930 |
| 2,252,984 | Rutherford et al. | Aug. 19, 1941 |
| 2,494,283 | Cassaday et al. | Jan. 10, 1950 |
| 2,542,604 | Weisel et al. | Feb. 20, 1951 |
| 2,656,374 | Gamrath | Oct. 20, 1953 |
| 2,815,324 | Zenftman | Dec. 3, 1957 |